June 14, 1932.　　　C. H. MORROW　　　1,862,630
DOMESTIC HOT WATER HEATER
Filed March 12, 1928　　　2 Sheets-Sheet 1
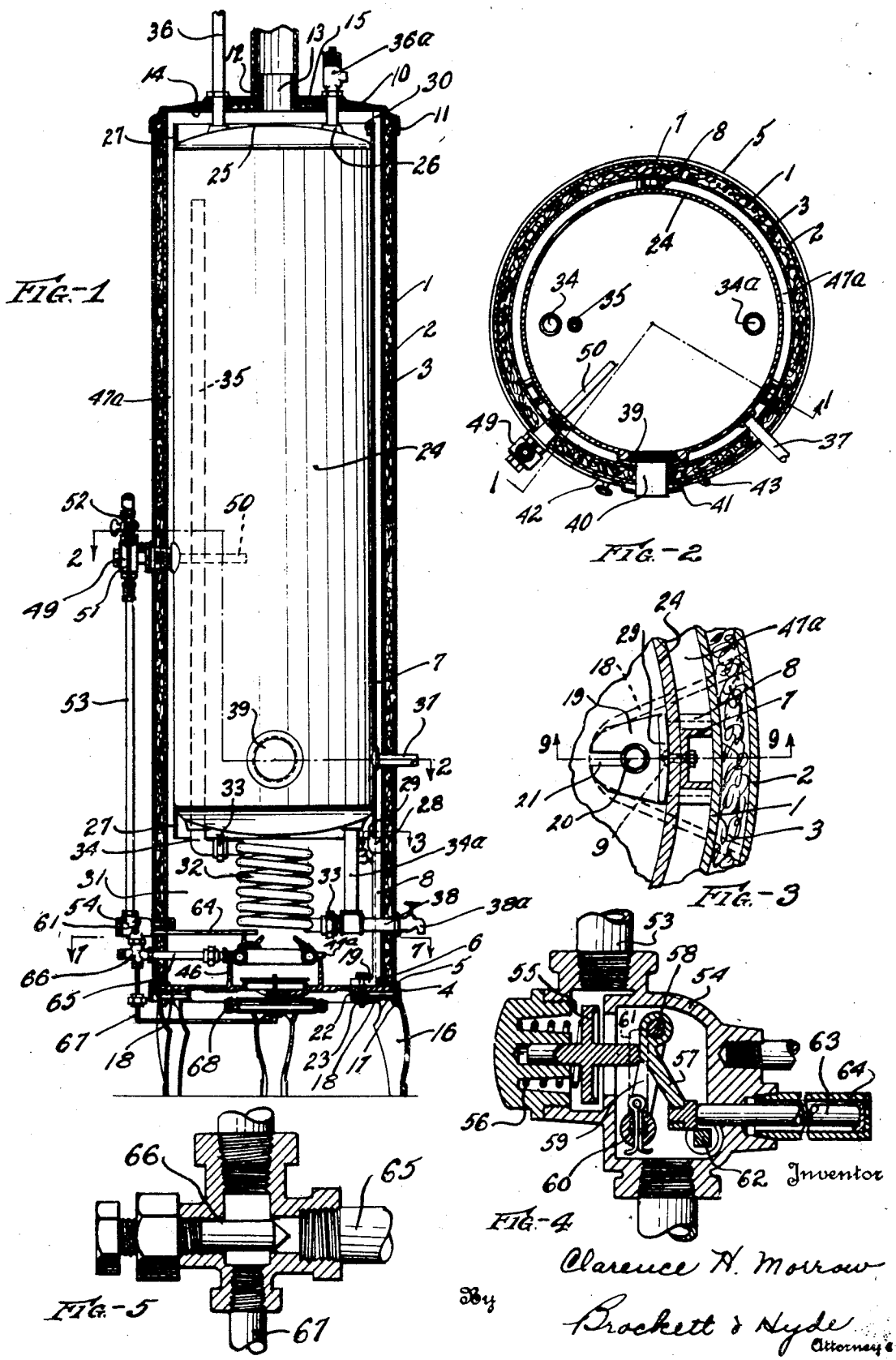

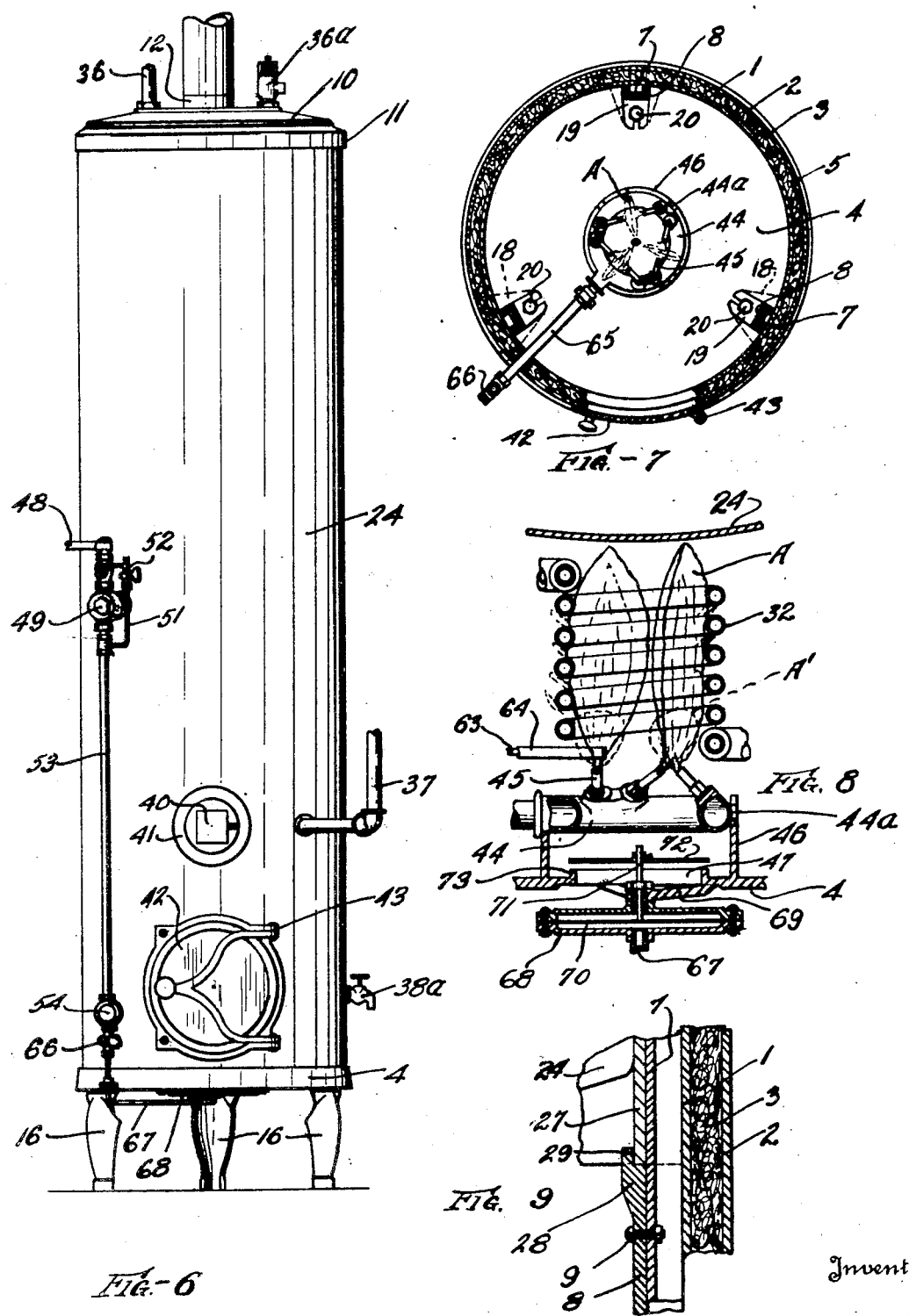

Patented June 14, 1932

1,862,630

UNITED STATES PATENT OFFICE

CLARENCE H. MORROW, OF CLEVELAND, OHIO, ASSIGNOR TO THE HOTSTREAM HEATER COMPANY, OF CLEVELAND, OHIO, A CORPORATION OF OHIO

DOMESTIC HOT WATER HEATER

Application filed March 12, 1928. Serial No. 261,160.

This invention relates to domestic hot water heaters of the storage type. The object of the invention is to provide an improved heater which is very efficient and provides and stores any suitable quantity of hot water and maintains the same at any desired temperature, all the necessary parts being included in a single unit merchantable as such.

A further object of the invention is to provide an arrangement of this kind which not only insulates the heating device, such as the coil, but equally insulates the storage tank or reservoir, and nevertheless provides convenient access to all parts and, more important, enables the heating coil to be readily removed for repair, replacement or the like. A further object of the invention is to improve the efficiency of the heating burner and coil by their mutual association in a manner to take advantage of the maximum heating value of the fuel consumed, and to reduce heat loss by preventing travel of cooling air along the heated surfaces when the main burner is turned down or out, preventing the waste of heat to the stack.

A further object of the invention is to improve various structural details enabling the device to be made, assembled, sold and maintained at low cost.

Further objects of the invention are in part obvious and in part will appear more in detail hereinafter.

In the drawings, which represent one suitable embodiment of the invention, Fig. 1 is a detail sectional elevation on approximately the line 1—1, Fig. 2, looking in the direction of the arrows, the tank being shown in elevation; Fig. 2 is a sectional plan view on approximately the line 2—2, Fig. 1; Fig. 3 is a detail sectional plan view on the line 3—3, Fig. 1; Fig. 4 is a sectional elevation of a safety valve; Fig. 5 is a detail sectional view of a throttle valve; Fig. 6 is a front elevation; Fig. 7 is a sectional plan view on approximately the line 7—7, Fig. 1; Fig. 8 is a detail sectional elevation through the heating burner and coil and air valve, on a larger scale, to illustrate the heating operation; and Fig. 9 is a detail section through the head of a supporting member, on the line 9—9, Fig. 3.

Referring generally to the invention, the present domestic water heater unit includes a suitable insulating casing or jacket provided with supporting legs and forming a frame in which is mounted a storage tank or receptacle, below which are a heating coil and burner in a closed chamber provided with valve means for controlling the flow of air thereto, the arrangement being such that the products of combustion which leave the coil travel into efficient heat conducting relation with the tank to transmit further heat value thereto and decrease the stack less. The frame supports all other parts so that the whole unit may be transported bodily, such as in shipping it to the place of use, although it may be distributed in knock-down form.

In the drawings, the outer casing or jacket is cylindrical and includes inner and outer sheet metal walls 1, 2 separated by an annular space 3 filled with suitable insulating material, such as asbestos wool or the like, although air alone in some cases affords sufficient insulation. These concentric walls, at their lower ends, rest upon a round base casting 4 and preferably between annular ribs or flanges 5, 6 thereof, which center them on the base. They also surround a plurality, three being shown, of upright posts or columns of suitable form, such, for example, as the three channel members 7 having outwardly extending flanges and at their lower ends nesting in channel-like base members 8 to which they are bolted, as at 9, and which in turn are anchored to the base casting 4, as will appear. At the top the shell 3 is slightly longer than the shell 2, and upon them rests a closure or cover 10, flanged with a skirt at 11 to surround the outer shell and provided with perforated bosses for the piping, as well as with a short central neck 12 through which extends a pipe 13 attached to an inner plate 14, the plate 14 and cover 10 forming between them a cavity 15 which may also be filled with heat insulating material. Pipe 13 may be suitably connected to a stack or flue for carrying off the products of combustion.

On its lower face the base 4 is flanged downwardly and within and around it are distributed a plurality of supporting legs, usually like in number to the posts 7, 8. Each leg may be of pressed or cast metal, including a body portion 16 having an upper curved recess 17 to receive the skirt flange of the base and an inwardly extending portion 18 lying beneath a foot 19 of one of the base members 8. The posts and legs are both secured to the base casting by the same bolt 20, which extends through a slotted opening 21 in the foot 19, with its head above said foot, and thence through an opening in the base casting, below which it is provided with a clamping nut 22. A further extension of the bolt passes through the head 18 of the leg 16, below which it is provided with a second clamping nut 23. This arrangement enables the leg to be removed from the unit without disturbing the assembly of the parts above the base plate.

The posts or columns, including the two members 7, 8 of each, not only serve to support the tank or reservoir and attached parts, but to also center the same within the jacket and to form spacing means between the tank and jacket. The tank or reservoir, marked 24, is of ordinary form. It is cylindrical with its axis vertical. It has convex end heads 25 provided with perforated bosses 26 for pipe connections, and its convex end heads are contained within flange extensions 27 of its outer wall, so that the tank will stand upright on the floor either end up. It is supported directly upon the posts or columns, for which purpose each of the base members 8 is provided with a head 28 having a small projection 29 lying slightly inside of the web of the channel 7, forming a recess or seat to receive an edge of the lower tank flange 27, as shown in Fig. 9. The tank is therefore spaced from the inner shell 1 of the jacket by at least the depth of the flanges of channel 7, providing an annular open space around the tank and within the outer shell through which the products of combustion flow upwardly for their discharge to the stack by way of the pipe 13. To provide further rigidity, the upper tank flange may be bolted or otherwise secured at intervals to the several columns or posts, as at 30.

In the chamber 31 above the base 4 and below the tank are located the heating parts. These include a suitable water circulating coil 32 preferably of such form as to be readily removable from the jacket, as will appear. This coil is shown as of helical form with its axis vertical and connected by unions 33, to pipe connections 34, 34a, at the lower end of the tank. One connection 34a opens directly into the bottom of the tank and communicates with the lower end of the coil 32. The other connection 34 has an extension 35 almost to the top of the tank. The circulation of water for heating therefore is from the bottom of the tank to the bottom of coil 32 and thence upwardly through the pipe 35 nearly to the top of the tank adjacent the pipe 36 by which hot water is distributed to the fixtures. 36a is a pressure operated safety valve. 37 is the cold water supply pipe and 38 is a drain outlet extending to the outside of the casing or jacket, where it is provided with a valve or faucet 38a.

39 is a clean-out opening for the tank or reservoir. It is of large size, big enough for the average hand and wrist, and is preferably closed by a large hollow threaded cap 40, having a non-circular, such as square, portion, extending to the outside of the jacket and accessible for application of a wrench thereto, and which may be locked in position by a removable ring 41, which is curved to fit the cylindrical outer surface of the jacket. This arrangement provides very convenient access to the interior of the tank and one which can be opened with certainty and without danger of breaking the cap, as is the case with the usual thin plugs for this purpose.

The chamber 31 is closed by a suitable door 42 hinged at 43 on a vertical axis and provided with the usual latch and handle. The door opening is big enough to enable the workman to reach in through it to insert or manipulate the burner and coil or adjust the air valve, and particularly is large enough so that he can manipulate the unions 33 and take out or put back the coil without manipulating or removing other parts except possibly the burner, which also is removable. The heating coil is one part which suffers considerable grief and in this heater it is removable for repairs or replaceable with minimum effort.

The heating coil lies above a suitable burner which specifically may be of the general form shown in the patent to H. E. Kerr, 1,580,904, granted April 13, 1926. It includes a hollow ring or manifold 44 supported on an annular flange 44a and provided with a series, six being shown, of diagonal jets 45 arranged in pairs converging upwardly at an angle, forming a series of flames by the impact of the gas streams upon each other. The flames are more or less flat and lie in vertical radial planes, as indicated more or less roughly at A, Figs. 7 and 8. The burner is spaced at a proper level beneath coil 32 so that when it is turned on full the flames rise with opportunity for full development and combustion and lie practically wholly within the chamber formed by the circuitous turns of the coil 32, which lie fairly close together, and which chamber extends nearly up to the lower convex end of the tank. Even when the burner is turned low, as for pilot purposes, when the flame is small as indicated at A', Fig. 8, the flames are just beneath or in fairly close juxtaposition to the lower coils.

The burner is supported on an upwardly extending annular collar or flange 46 of the base casting surrounding a central opening 47 through which the air for combustion is admitted. This is the only material opening in the base casting or plate, so that all of the air for combustion flows through said opening directly to the burner and through its center to the jets 45, the flange 44a forming a shield to compel air flow to the burner instead of outwardly around it. The entire flame formation is in a restricted chamber within the coil and maximum heat value for the fuel consumed is therefore transmitted directly from the burner to the coil. However, some of the heat is applied directly from the restricted chamber aforesaid to the bottom head of the tank and the products of combustion then pass radially outwardly and flow upwardly in the space 47a between the tank and inner shell wall toward the stack outlet 13 and thereby impart additional heat value to the water in the tank.

The burner is supplied by gas coming from a pipe 48 connected to the gas supply main. This pipe communicates with a suitable thermostatic valve, marked generally 49, passing through the outer jacket and threaded into an opening in the wall of the tank and having a portion marked 50 immersed in the water in the tank and sensitive to its temperature. This valve may be of the form shown in my prior application Ser. No. 49,384 filed August 10, 1925. As is usual, the member 50 more or less opens or closes the thermostatic valve to vary the supply of to increase or diminish gas to the burner as the water temperature changes.

51 is a by-pass pipe provided with a valve 52 by which a small quantity of gas continually flows from the supply pipe 48 around the thermostatic valve to the pipe 53 for conduction to the burner for pilot purposes. In the pipe 53 may be located a suitable safety valve, marked generally 54 and including a controlling element extending into the field or zone of one or more of the gas flames of the burner and particularly into range of the flame when it is burning low for pilot purposes, and so arranged as to maintain proper flow of gas to the burner when it is burning either as a pilot or with full flame, but to shut off all gas flow if the burner goes out while functioning either as a full burner or for pilot purposes.

The valve shown in Fig. 4 for this purpose, briefly described, includes a casing 54 in which is a movable valve 55 yieldingly seated by a spring 56, and the stem of which abuts a lever 57 connected at 58 by a floating pivot to the arm 59 pivoted at 60 on a rod extending to the outside of the casing and provided with an operating handle 61. In the operative position, when gas is permitted to flow, the parts occupy the position shown, with the foot end of lever 57 lying above a fixed shoulder or projection 62 in the casing and in front of a relatively non-expansible, such as a carbon, rod or pencil 63 held within the expansible thermostatic tube 64 which may be of copper or brass. With the burner flame ignited, the copper tube 64 is expanded, but if the flame goes out, tube 64 contracts and the pencil 63 is pushed over to the left, finally pushing lever 57 off from its seat on the shoulder 62, so that the spring 56 becomes effective to seat the valve by motion of arm 59 to the right. The valve 55 remains closed until the operator turns the handle 61 to push the valve back and raise the foot of lever 57 above seat 62. Holding the parts manually in this position, he lights the burner and the flame causes expansion of tube 64 so that lever 57 moves into the position shown and is there held until the tube 64 again cools, such as by accidentally extinguishing the flame.

The gas outlet from the safety valve 54 communicates with the burner by way of a pipe 65 in which is a simple throttle valve 66, shown in detail in Fig. 5, and having a lateral outlet to a pipe 67.

Suitable means is also provided for controlling the flow of air to the burner chamber 31 and thus to the stack, in accordance with the condition of the main burner, so that a full air supply is provided when the burner is turned on full and the air supply is reduced when the burner is turned down or out. The means shown is controlled by the pressure of the gas supply to the burner. It includes a chambered casing 68 suitably mounted on a spider 69 just below the opening 47, and in which casing is a diaphragm 70 provided with a rod 71 extending upwardly through the spider and carrying a disk-like valve plate 72 adapted to cooperate with a seat on the edge of a flange 73 around the edge of said opening. The chamber below the diaphragm communicates with the pipe 67. With this arrangement, when the gas supply to the burner is turned on full, the pressure of the gas is sufficiently built up beneath the diaphragm to raise the valve plate 72 and permit full flow of air to the burner, but if the gas supply is turned off or is even reduced to pilot value, the pressure beneath the diaphragm is reduced so that the valve seats, or nearly so, and prevents flow of air past the heated parts, doing away with the liability of carrying valuable heat to the stack.

What I claim is:

1. A domestic water heater, comprising a base having a horizontal wall provided with a central opening and an upstanding collar surrounding the same, a tank supported by said base and lying above the same, a water-circulating heat-absorbing coil communicating with said tank and lying above and within said collar, and a ring shaped burner supported by said collar and lying within the same and provided with jet producing members adapted to direct jets of flame upon said coil.

2. A domestic water heater of the character described in claim 1, including a disc form valve lying above and adapted to open and close said opening and when open serving to baffle the air supplied to said burner and prevent direct travel thereof through the ring opening.

3. A domestic water heater, comprising a base provided with a central air inlet opening, a disc-like valve controlling the same and arranged to baffle the air passing through said opening, a collar above and surrounding said opening, a ring shaped burner supported by and lying within said collar, a tank supported above said burner, and a helical form water-circulating heat-absorbing coil communicating with said tank and lying above and coaxial with said burner, the diameter of said coil being less than that of said collar, whereby said opening, burner, and coil in effect form a hollow shaft directing all heated products of combustion upon said coil or directly upon the bottom of said tank.

In testimony whereof I hereby affix my signature.

CLARENCE H. MORROW.